Dec. 14, 1943.    H. E. FELLOWS    2,336,931
MOLDING MACHINE LEVELING AND CLAMPING MECHANISMS
Filed Aug. 28, 1942    2 Sheets-Sheet 1
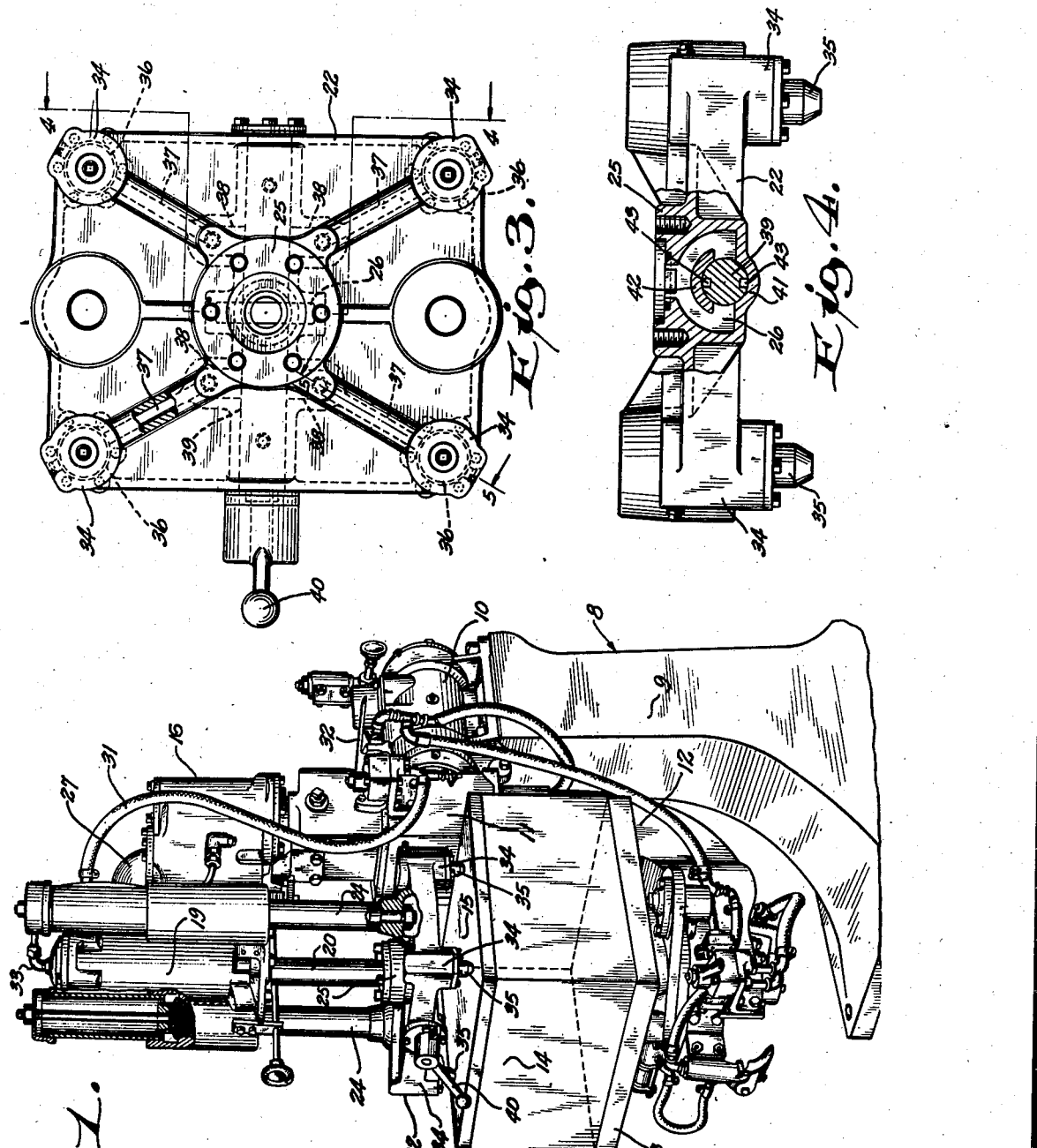
INVENTOR:
Harrison E. Fellows,
BY Morsell & Morsell
ATTORNEYS

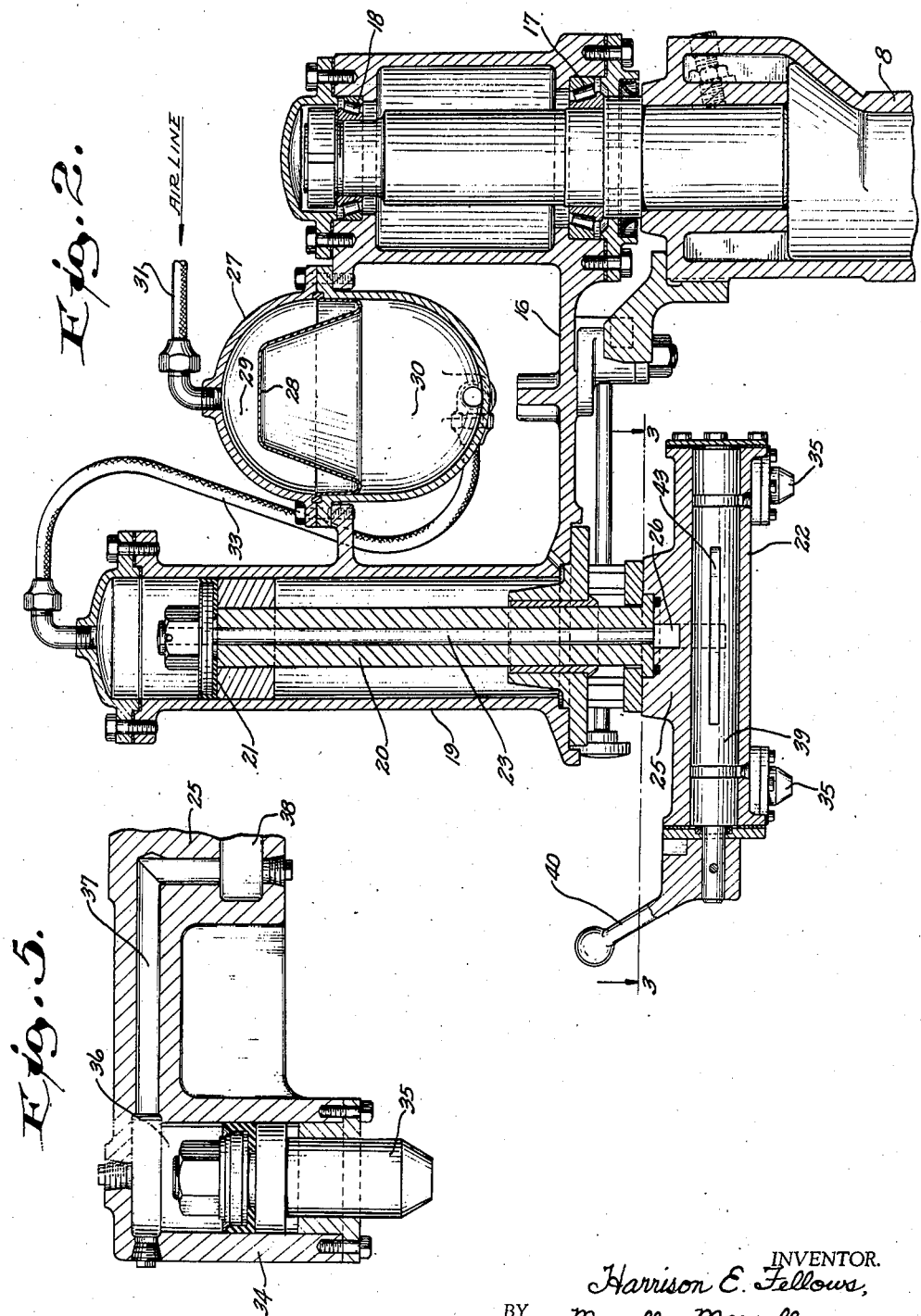

Patented Dec. 14, 1943

2,336,931

UNITED STATES PATENT OFFICE 2,336,931

MOLDING MACHINE LEVELING AND CLAMPING MECHANISM

Harrison E. Fellows, Wauwatosa, Wis., assignor to Milwaukee Foundry Equipment Company, Milwaukee, Wis., a corporation of Wisconsin Application August 28, 1942, Serial No. 456,515

8 Claims. (Cl. 22—91)

This invention relates to improvements in molding machine leveling and clamping mechanisms.

In certain types of molding machines, of which a roll-over machine is a good example, bottom boards or core plates are applied against those open sides of the flasks or core boxes which ultimately become the bottom portions during drawing operations. It is essential that a bottom board or core plate be applied to a flask or core box in a manner so that the board or plate is level, and it is furthermore essential that the bottom board or plate be clamped to the flask or core box.

With the above in mind, it is a primary object of the above invention to provide, in a molding machine, automatically operating mechanism for leveling or clamping a bottom board or core plate relative to a flask or core box mounted on the molding machine table.

A further object of the invention is to provide, in a molding machine, automatic and hydraulic means for simultaneously leveling and clamping the bottom board of a mold or flask.

A further object of the invention is to provide a molding machine in which the platen portion thereof is equipped with spaced leveling and clamping buttons adapted to engage and contact uneven outer surface portions of a flask bottom board and automatically operated and controlled in a manner so that said buttons are initially fully projected with pressure behind them, and after contacting the bottom board some or all of the buttons recede, as required, and with pressure behind them to compensate for the uneven surface portions of the bottom board which they engage, said leveling and clamping buttons then being automatically locked in their properly extended compensating positions.

A further object of the invention is to provide, in a roll-over molding machine, hydraulically operated bottom board leveling and clamping mechanism including an oil reservoir in the roll-over head of the machine, whereby tubes, connections, and fittings are minimized, the reservoir unit in the roll-over head additionally including an airtight diaphragm which, because of the roll-over feature, prevents air from getting into the oil reservoir and oil lines as the latter contingency would prevent proper functioning of the leveling and clamping mechanism by impairing the formation of solid oil columns behind the adjusted leveling and clamping buttons.

A further object of the invention is to provide a bottom board leveling and clamping mechanism which may be readily incorporated in a roll-over molding machine as an integral part thereof, and with a minimum of modification.

A further object of the invention is to provide a molding machine leveling and clamping mechanism which is automatic and positive in its operation, which is simple and rapid in performance, which is strong and durable, and which is well adapted for the purposes set forth.

With the above and other objects in view, the invention consists of the improved molding machine leveling and clamping mechanism, and its parts and combinations as set forth in the claims, and all equivalents thereof.

In the accompanying drawings in which the same reference characters indicate the same parts in all of the views, Fig. 1 is a perspective view of a roll-over molding machine equipped with the improved bottom board leveling and clamping mechanism and showing the position of a flask on the molding machine table prior to the roll-over operation and with the flask bottom board in leveled and clamped position through the operation of the improved mechanism, certain parts in the view being broken away and in section to show structural details;

Fig. 2 is an enlarged vertical sectional view through the head portion of the molding machine showing the platen operating piston raised;

Fig. 3 is a horizontal sectional view taken on line 3—3 of Fig. 2;

Fig. 4 is a detail sectional view taken on line 4—4 of Fig. 3 only showing the leveling and clamping buttons projected and the control lever in closed position; and Fig. 5 is an enlarged fragmentary detailed view taken on line 5—5 of Fig. 3 only showing the button projected.

Referring now more particularly to the drawings it will appear that a molding machine, which by way of illustration is a roll-over machine, is indicated generally by the numeral 8. The massive base or pedestal portion 9 of the machine has associated with the upper end of its vertical portion a trunnion 10 from which projects a bracket 11 clampingly engaging an intermediate portion of an arm 12.

In the normal and starting position of the molding machine the major portion of the arm 12 assumes a vertical position and its curved lower end portion supports a table 13 and certain valve and other mechanisms. On the top horizontal face of the table 13 a flask or core box 14 is adapted to be positioned for certain molding operations including filling, ramming and jolting. What is then the open top side of the flask 14 is covered by a bottom board or core plate 15.

The head portion 16 of the molding machine is swingable in an arc relative to the upper end of the arm 12, which provides the axis, and the swinging movements are facilitated by roller bearings 17 and 18. As will appear from the drawings, the head 16 extends laterally of the arm 12 and its extended portion carries a cylinder 19 housing a piston rod 20 with a piston 21 at its inner end. The outer end of the piston is connected to an intermediate chambered portion 25 of a platen 22. For the purpose to appear hereinafter the piston rod 20 is provided with a longitudinal bore 23, the outer end of which communicates with an arch-shaped fluid cavity 26 in the chambered portion 25 of the platen. On opposite sides of the cylinder 19 the head 16 carries spring urged guide plungers 24 whose outer ends are connected to the platen 22.

Formed integral with the head 16 is an enclosed reservoir 27 internally divided by an airtight flexible diaphragm 28 into an air chamber 29 and an oil chamber 30. Compressed air from a source of supply (not shown) may be fed into the air chamber 29 through a flexible connection 31, and the flow of air under pressure through said connection and into the chamber 29 is controlled by a hand valve 32. An oil line or tube 33 connects the oil chamber 30 of the reservoir 27 with that portion of the cylinder 19 which is normally the upper end thereof.

The four corners of the platen 22 are formed with hollow posts 34 in which are reciprocatably mounted leveling and clamping buttons or pins 35. The outer ends of said buttons project beyond the face of the platen which is adjacent the bottom board 15, while the inner ends of said buttons are adapted to have oil react thereagainst, the oil being forced into cavities 36 within the posts 34. Diagonally extending oil ducts 37 are also formed within the platen and the outer ends of the same connect with the cavities 36. The inner ends of said ducts 37 connect with off-set oil chambers 38 (see Fig. 3), the latter also being in controlled communication with the arch-shaped cavity 26.

Revolubly mounted transversely through the platen 22 is a cylindrical valve 39 on whose external end there is an operating handle 40. Said valve 39 passes through the arch-shaped cavity 26 and therewithin top and bottom portions of the valve engage and are covered by curved walls 41 and 42 (see Fig. 4). The side portions of the medial portion of the valve are exposed to the cavity 26. Diametrically opposed longitudinal grooves 43 are formed in outer intermediate portions of the valve 39.

From the description thus far given it will be evident that the piston rod 20, when oil under pressure reacts against the piston 21, is effective to project or reciprocate the platen 22. Also, oil which is forced into the cylinder 19 and flows through the bore of the piston 20, is effective to operate the leveling and clamping buttons 35. For instance, let it be assumed that the molding machine is originally in the position illustrated in Fig. 1, only with the platen 22 in its raised or retracted position. The flask 14, covered by the bottom board 15, is seated on the molding machine table 13. Presumably the flask has been filled, rammed, and jolted, and it is desired to next level and clamp the bottom board 15. The compressed air control valve 32 is opened and compressed air then flows into the chamber 29 of the reservoir 27, reacting against and flexing the diaphragm 28. This action will force oil out of the oil chamber 30 of the reservoir 27, and via the connection 33 oil under pressure is introduced into the end of the cylinder 19. This oil reacting against the piston 21 will project the piston rod 20 and lower the platen 22 carried thereby, the platen being guided by the plungers 24. Oil will also flow through the bore 23 of the piston rod 20 and will enter the arch-shaped cavity 26 in the platen 22. If the buttons 35 are to be operated for leveling and clamping purposes, the valve handle 40 should be turned so that the cylindrical valve 39 will present the valve grooves on the sides of the cavity 26 to communicate therewith. Oil will then flow from the arch-shaped cavity 26, through the cylindrical valve grooves 43, into the offset oil chambers 38, and from thence through the ducts 37 into the upper ends of the cavities 36 within the platen corner posts 34. The oil columns thus established will project the buttons 35 to cause the same to contact the bottom board 15, and because the oil columns are not then locked any of the buttons are free to recede and properly locate for leveling and clamping purposes relative to the uneven surfaces of the bottom board 15. After the buttons have assumed their proper positions of projection for leveling and clamping purposes, they should be locked in position. This is accomplished by reversing the position of the cylindrical valve 39 so as to bring the grooves 43 into the position shown in Fig. 4 whereupon communication between the arch-shaped chamber 26 and the ducts 37 will be closed. Solid columns of oil will then be established back of the buttons 35 in their adjusted projected positions.

The molding machine is then ready for the roll-over operation, and upon a complete roll-over the head is at the bottom and the curved end of the arm 12 and the table 13 are on top. During this roll-over operation and subsequently, certain features of the reservoir 27 are of importance. It will be noted that the reservoir is incorporated in the head 16 of the molding machine and hence rolls over and is inverted during the roll-over operation. The flexible diaphragm 28 within the reservoir 27 is air-tight, and this is of considerable importance because if air could seep from the chamber 29 into the oil chamber 30, it would prevent the establishment of solid oil columns for the operation of the piston 20 and buttons 35. However, the diaphragm 28 does not permit any leakage of air from the air chamber into the oil chamber of the reservoir and the undesirable possibility mentioned is entirely prevented.

Following the roll-over operation, the piston 20 may be operated to recede, lowering the platen and bottom board, whereby the drawing operation takes place. Then the head may be pivoted to swing the platen 22 laterally of the mechanism thereabove so that the completed mold or core may be removed. Finally the machine is rolled over to its original starting position.

As used herein and in the claims, the term "flask" is intended to cover and include, in addition to a conventional flask, a core box or other form of mold, pattern, or core enclosure mounted on the table 13 of the molding machine. Also as used herein and in the claims, the term "bottom board" is intended to cover not only a conventional bottom board as applied to a flask on the table 13, but a core plate or any form of covering for the open side of the enclosing member positioned on the molding machine table.

From the foregoing description it will be seen that the improved molding machine provides novel and effective means for flask bottom board leveling and clamping. The leveling and clamping mechanism operates automatically and expeditiously utilizing the hydraulic medium which is available for the reciprocation of the platen. The mechanism is compactly housed within the head of the molding machine so that a minimum of tubes, connections, and fittings are required. The molding machine leveling and clamping mechanism is furthermore of simple, novel, and inexpensive construction, and is well adapted for the purposes described.

What is claimed as the invention is:

1. In a molding machine having a reciprocatably mounted platen, a plurality of spaced members reciprocatably mounted in the platen and projecting from one side thereof, means for supplying a column of fluid against the platen to project the same and for simultaneously supplying separate, variable length columns of fluid against all of said spaced members to yieldingly project the latter, and means for locking the established variable length fluid columns against said spaced members to rigidly hold the same in adjusted, compensating, projected positions.

2. In a molding machine having a movable head and a platen reciprocatably mounted relative to said head, a plurality of spaced leveling and clamping plungers reciprocatably mounted in the platen and projecting from one side thereof, a unitary oil reservoir carried by the head, means for supplying from the reservoir a column of oil to react against the platen to project it and to simultaneously supply from the reservoir separate, variable length columns of oil to react against said plungers to yieldingly project the same, and means for locking the variable length oil columns against said plungers to rigidly hold the latter in adjusted, compensating, projected positions.

3. In a molding machine having a movable head and a platen reciprocatably mounted relative to said head, a plurality of spaced leveling and clamping plungers reciprocatably mounted in the platen and projecting from one side thereof, a unitary oil reservoir carried by the head, valve controlled pressure means for supplying from the reservoir a column of oil to react against the platen to project it and to simultaneously supply from the reservoir separate, variable length columns of oil to react against said plungers to yieldingly project the same, and valve means for locking the variable length oil columns against said plungers to rigidly hold the latter in adjusted, compensating, projected positions.

4. In combination, a molding machine having a table, a flask thereon, a bottom board covering an end of the flask, a platen with a work face movable adjacent but spaced from the bottom board, plungers yieldingly reciprocatably carried by the platen, common means for bodily moving said platen vertically and for compensatingly projecting said plungers relative to the platen and beyond the work face of the platen into leveling and clamping engagement with spaced portions of the bottom board, and means for rigidly locking said plungers in their projected, engaging positions.

5. In combination, a molding machine having a table, a flask thereon, a bottom board covering an end of the flask, a platen with a work face movable adjacent but spaced from the bottom board, plungers yieldingly reciprocatably carried by the platen, common valve controlled hydraulic means for moving said platen and for compensatingly projecting said plungers beyond the work face of the platen into leveling and clamping engagement with spaced portions of the bottom board, and valve means for rigidly locking said plungers in their projected, engaging positions.

6. In a molding machine having a movable head and a platen reciprocatably mounted relative to said head, a plurality of spaced leveling and clamping plungers reciprocatably mounted in the platen and projecting from one side thereof, a unitary oil reservoir carried by the head and movable therewith, means for varying the pressure within the oil reservoir to supply therefrom a column of oil to react against the platen to project it and to simultaneously supply from the reservoir separate, variable length columns of oil to react against said plungers to yieldingly project the same, and means for locking the variable length oil columns against said plungers to rigidly hold the latter in adjusted, compensating, projected positions.

7. In a roll over molding machine having a movable head and a platen reciprocatably mounted relative to said head, a plurality of spaced, hydraulic leveling and clamping plungers reciprocatably mounted in the platen and projecting from one side thereof, a unitary reservoir carried by the head and movable therewith, a flexible diaphragm within the head dividing it into an oil chamber and an air pressure chamber, said diaphragm sealing the chambers from each other, means for varying the pressure within the air pressure chamber of the reservoir for actuating the diaphragm to supply from the oil chamber a column of oil to react against the platen to project it and to simultaneously supply from the oil chamber separate variable length columns of oil to react against said plungers to yieldingly project the same, and means for locking the variable length oil columns against said plungers to rigidly hold the latter in adjusted compensating projected positions.

8. In a roll-over molding machine, in combination, a table, a flask therein, a bottom board covering an end of the flask, a turnable head, a cylinder within said head, a piston and piston rod operable within the cylinder, a chambered platen carried by the piston rod and adapted to be reciprocated toward and away from said bottom board, the piston being tubular to afford fluid communication between the cylinder and the chambers of the platen, said platen also having spaced hollow posts in communication with the chambers in the platen, leveling and clamping plungers reciprocatably mounted in said hollow posts, a unitary reservoir carried by the head and movable therewith, a flexible airtight diaphragm dividing the interior of the reservoir into a pressure chamber and an oil chamber, a fluid connection between the oil chamber and said cylinder, means for changing the pressure within said air pressure chamber to flex the diaphragm to force oil from the oil chamber into the cylinder to react against the piston to project the platen and to also flow through the piston into the chambered platen against the plungers to yieldingly project the same into leveling and clamping engagement with spaced outer surface portions of the bottom board, and a valve within the chambered platen controlling the flow of oil relative to the plungers.

HARRISON E. FELLOWS.